United States Patent [19]

Futamura

[11] Patent Number: 5,955,531
[45] Date of Patent: Sep. 21, 1999

[54] PNEUMATIC TIRES HAVING REDUCED ROLLING RESISTANCE

[75] Inventor: Shingo Futamura, Wadsworth, Ohio

[73] Assignee: Bridgestone Corporation, Tokyo, Japan

[21] Appl. No.: 08/120,314

[22] Filed: Sep. 13, 1993

Related U.S. Application Data

[63] Continuation of application No. 07/886,919, May 22, 1992, abandoned.

[51] Int. Cl.$^6$ .............................. C08F 4/58; C08K 3/04; B60C 1/00
[52] U.S. Cl. .................. 524/495; 524/496; 524/511; 525/237; 525/332.9; 525/359.3; 526/340; 152/524; 152/539; 152/547; 152/548
[58] Field of Search ................................ 524/495, 496, 524/511; 525/237, 332.9, 359.3; 526/340; 152/525, 539, 547, 548

[56] References Cited

U.S. PATENT DOCUMENTS

| | | | |
|---|---|---|---|
| 3,109,871 | 11/1963 | Zelinski et al. | 260/85.1 |
| 3,177,190 | 4/1965 | Hsieh | 260/94.2 |
| 3,178,398 | 4/1965 | Strobel et al. | 260/85.1 |
| 3,317,918 | 5/1967 | Foster | 260/83.7 |
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,543,828 | 12/1970 | Colombes et al. | 152/361 |
| 3,856,877 | 12/1974 | Otsuki et al. | 260/677 |
| 3,983,919 | 10/1976 | Messerly | 152/357 |
| 4,015,061 | 3/1977 | Schulz et al. | 526/178 |
| 4,026,865 | 5/1977 | Uraneck et al. | 260/42.32 |
| 4,085,265 | 4/1978 | Otsuki et al. | 526/49 |
| 4,203,481 | 5/1980 | Ranik, Jr. | 152/330 |
| 4,247,418 | 1/1981 | Halasa et al. | 252/431 |
| 4,334,567 | 6/1982 | Bond | 152/209 |
| 4,383,085 | 5/1983 | Fujimaki et al. | |
| 4,407,346 | 10/1983 | Bandel et al. | 152/209 |
| 4,414,372 | 11/1983 | Farnham et al. | 526/190 |
| 4,429,031 | 1/1984 | Hall et al. | 526/178 |
| 4,476,240 | 10/1984 | Hall et al. | 502/155 |
| 4,478,953 | 10/1984 | Yuki et al. | 502/155 |
| 4,515,922 | 5/1985 | Sakakibara et al. | 525/99 |
| 4,523,618 | 6/1985 | Yamamoto et al. | 525/194 |
| 4,544,711 | 10/1985 | Mancinelli | 525/332.9 |
| 4,603,722 | 8/1986 | Oshima et al. | 525/332.3 |
| 4,614,771 | 9/1986 | Watanabe et al. | 525/351 |
| 4,616,069 | 10/1986 | Watanabe et al. | 525/333 L |
| 4,644,988 | 2/1987 | Ahmad et al. | 524/496 |
| 4,677,153 | 6/1987 | Kitahara et al. | 524/552 |
| 4,711,285 | 12/1987 | Ogawa et al. | 524/511 |
| 4,734,461 | 3/1988 | Roggero et al. | 525/293 |
| 4,735,994 | 4/1988 | Roggero et al. | 525/285 |
| 4,736,003 | 4/1988 | Schneider et al. | 526/190 |
| 4,778,857 | 10/1988 | Graves et al. | 525/375 |
| 4,791,174 | 12/1988 | Bronstert et al. | 525/333 |
| 4,816,520 | 3/1989 | Bronstert | 525/285 |
| 4,835,209 | 5/1989 | Kitagawa et al. | 524/507 |
| 4,843,120 | 6/1989 | Halasa et al. | 525/53 |
| 4,894,409 | 1/1990 | Shimada et al. | 524/492 |
| 4,914,147 | 4/1990 | Mouri et al. | 524/495 |
| 4,931,376 | 6/1990 | Ikematsu et al. | 526/164 |
| 4,935,471 | 6/1990 | Halasa et al. | 525/359.1 |
| 4,942,147 | 7/1990 | Yoshida et al. | 524/495 |
| 5,066,729 | 11/1991 | Stayer, Jr. et al. | 525/333 L |
| 5,109,907 | 5/1992 | Stayer, Jr. et al. | 152/564 |
| 5,124,396 | 6/1992 | Branan, Jr. et al. | 524/496 |
| 5,132,357 | 7/1992 | Endter et al. | 524/496 |
| 5,153,159 | 10/1992 | Antkowiak et al. | 526/180 |

FOREIGN PATENT DOCUMENTS

| | | |
|---|---|---|
| 0067111 | 12/1982 | European Pat. Off. |
| 0264506 | 4/1988 | European Pat. Off. |
| 0282437 | 9/1988 | European Pat. Off. |
| 0290883 | 11/1988 | European Pat. Off. |
| 0316255 | 5/1989 | European Pat. Off. |
| 0 451 603 A2 | 10/1991 | European Pat. Off. .......... C08F 4/48 |
| 88104079 | 11/1991 | European Pat. Off. |
| 90630520 | 12/1991 | European Pat. Off. |
| 0 493 839 A1 | 7/1992 | European Pat. Off. .......... C08F 4/48 |
| 138070 | 10/1979 | Germany . |
| 247455 | 7/1987 | Germany . |
| 2117778 | 10/1983 | United Kingdom . |

OTHER PUBLICATIONS

"Preparation of Some Trialkyltin–lithium Compounds" by Gillman et al, J. Am. Chem. Soc., 75, 2507–2508 (1953).

"Some Reactions of Tributyl– and Triphenyl–stannyl Derivatives of Alkali Metals" by Blake et al, J. Chem. Soc., 1961, 618–622.

"Preparation and Reactions of Trialkyltinlithium" by Tamborski et al, J. Org. Chem., 28, 237 (1963).

Polymerization of Unsaturated Compounds in the Presence of Lithium Diethylamide, Vinogradov et al, *Polymer Science USSR*, vol. 4, 1963.

"Anionic Polymerization Initiated by Diethylamide in Organic Solvents" by Angood et al, Journal of Polymer Science, vol. 11, p. 2777 (1973).

(List continued on next page.)

*Primary Examiner*—James J. Seidleck
*Assistant Examiner*—Olga Asinovsky
*Attorney, Agent, or Firm*—Daniel N. Hall

[57] ABSTRACT

An improved pneumatic tire having decreased rolling resistance employing at least one tire component selected from the group consisting of subtreads, black sidewall, body ply skims and bead fillers, prepared from a vulcanizable elastomeric composition having reduced hysteresis comprises from about 10 to 100 parts by weight of an elastomer comprising a plurality of polymer molecules, wherein substantially each polymer molecule contains at least one functional group at the site of initiation, and having a hysteresis reduction of at least about 10 percent compared to the same elastomer without a functional group on substantially each polymer molecule; from about 0 to 90 parts by weight of an elastomer having greater hysteresis than the elastomer having reduced hysteresis and selected from the group consisting of natural rubber, synthetic rubber and blends thereof; and, from about 20 to about 100 parts by weight of carbon black, per 100 parts of the elastomer. A method is also provided for reducing the rolling resistance of tires.

48 Claims, No Drawings

OTHER PUBLICATIONS

*Chemical Abstracts,* vol. 91, No. 12, Sep. 1979, Chiba et al.
"New Perfectly Difunctional Organolithium Initiators for Block Copolymer Synthesis: Synthesis of Dilithium Initiators in the Absence of Polar Additives" Polymer, vol. 22, Dec., 1981, p. 1724, by Guyot et al.
"A Bifunctional Anionic Initiator Soluble in Non–Polar Solvents" Makromol. Chem., 179, 1978, pp. 551–555, by Beinert et al.
"Bifunctional Anionic Initiators: A Critical Study and Overview" Makromol. Chem., 186, 1985, pp. 2017–2024, by Bandermann et al.
"Anionic Polymerization Initiators Containing Protected Functional Groups" Journal of Polymer Science, vol. 15, 1977, pp. 2401–2410, by Schulz et al.
"Specific Functionalization of Polymers by Carboxyl Groups" Makromol. Chem., 179, 1978, pp. 1383–1386, by Broze et al.
"Anionic Polymerization. VII" American Chemical Society, vol. 33, 1981, pp. 513–528, Tai Chun Cheng.
"Thermal Elimination of Poly(phenyl vinyl sulfoxide) and Its Polystyrene Block Copolymers" 1990 American Chemical Society, vol. 23, pp. 4241–4246, by Kanga et al.

"Studies of the Anionic Polymerization of Phenyl Vinyl Sulfoxide and its copolymer with Styrene" American Chemical Society, 1990, vol. 23, pp. 4235–4240, by Kanga et al.

"3–Dimethylaminopropyl–Lithium—An Analytical and Kinetic Investigation of a New Initiator System for Polymer Synthesis" European Polymer Journal, vol. 11, 1975, pp. 699–704, by Eisenbach et al.

"Anionic Polymerization Initiators Containing Protected Functional Groups and Functionally Terminated Diene Polymers" Journal of Polymer Science, Polymer Chemistry Edition, vol. 12, 1974, pp. 153–166, by Schulz et al.

"An Improved Synthesis of p–Dimethylaminophenyl–Lithium" by G. Hallas and D.R. Waring, May 10, 1969 *Chemistry and Industry,* p. 620.

Derwent Abstract for JP850028373.

EPO Search Report for EPO Pat. App. No. 91306638.5 directed to a counterpart application.

PNEUMATIC TIRES HAVING REDUCED ROLLING RESISTANCE

This application is a continuation of application Ser. No. 07/886,919 filed May 22, 1992 which is now abandoned.

TECHNICAL FIELD

The subject invention relates to pneumatic tires, both radial and bias ply, which have improved rolling resistance. In particular, the tires of the present invention employ at least one tire component selected from the group consisting of subtreads, black sidewalls, body ply skims and bead fillers, prepared from an elastomeric composition of matter having reduced hysteresis. The elastomeric compositions, in turn, comprise diene polymers and copolymers, which carry at least one functional group on substantially every polymer chain at the site of initiation. Functionality can be imparted during initiation, at termination or both.

BACKGROUND ART

In the art, it is desirable to produce elastomeric compounds exhibiting reduced hysteresis. Such elastomers, when compounded to form articles such as treads for tires, will show an increase in rebound, a decrease in rolling resistance and will have less heat build-up when mechanical stresses are applied. Nevertheless, modifying the tread compound has disadvantages, namely the sacrifice of other tire performance such as wear, wet traction, dry traction, snow traction and chipping and cracking of the tread.

The main source of hysteretic power loss has been established to be due to the section of the polymer chain from the last cross link of the vulcanizate to the end of the polymer chain. This free end cannot be involved in an efficient elastically recoverable process, and as a result, any energy transmitted to this section of the cured sample is lost as heat. It is known in the art that this type of mechanism can be reduced by preparing higher molecular weight polymers which will have fewer end groups. However, this procedure is not useful because processability of the rubber with compounding ingredients and during shaping operations decreases rapidly with increasing molecular weight.

Another method of reducing hysteresis has been to react a lithium end-capped elastomer with a tin chloride compound to give polymer chains with terminated tin. Tin has an affinity for carbon-black, which affinity reduces hysteresis by removing the effect of a free end. However, with a plurality of polymer chains, endcapping is an inefficient process that results in only about 50–80 percent of the total number of chains being capped with tin. While this method has provided a decrease in hysteresis, the large number of polymer chains without a tin endcap do nothing to reduce hysteresis.

It is also known in the art to employ tin-containing organo-metal compounds as polymerization initiators. For instance, U.S. Pat. No. 3,426,006 discloses the catalyst lithium tributyl tin in diethyl ether for such a purpose. This initiator has been shown by Tamborshi et al, *Journal of Organic Chemistry*, volume 28, page 237 (1963) to be predominantly an equilibrium mixture of dibutyltin and butyl lithium wherein the butyl lithium is the more active initiator and hence, the polymer chains produced from its initiation actually contain little or no tin atoms. Thus, heretofore, the art has not shown a means whereby substantially each polymer chain of an elastomer can be provided with a tin end group resulting from the initiator.

The present invention employs tire components other than the tread, containing or prepared from low hysteresis elastomers. In this manner, rolling resistance can be improved without sacrificing desirable properties of the tread. It is also possible to utilize tread compounds having lower hysteresis properties than conventional with these components for even greater performance. However, the hysteresis reduction in the tread does not need to be maximized at the expense of other tread properties because the lower hysteresis properties of the other components will improve the overall rolling resistance of the tire.

It is therefore, an object of the present invention to provide pneumatic tires having improved rolling resistance.

It is a further object of the present invention to provide a method of improving the rolling resistance of tires.

It is another object of the present invention to provide tire components such as subtreads, black sidewalls, body ply skims and bead fillers containing or prepared from elastomers having reduced hysteresis properties.

It is yet another object of the present invention to provide tire components prepared from elastomers having a plurality of polymer molecules wherein substantially each molecule has a functional group at the site of initiation.

It is still another object of the present invention to provide tire components such as subtreads, black sidewalls, body ply skims and bead fillers containing or prepared from elastomers having a plurality of polymer molecules wherein substantially each molecule has a functional group at the site of initiation to provide low hysteresis, which elastomers can be blended with other polymers to avoid significant loss of other physical properties such as tear strength.

It is still another object of the present invention to provide tire components such as subtreads, black sidewalls, body ply skims and bead fillers containing or prepared from elastomers having a plurality of polymer molecules wherein substantially each molecule has a functional group at the site of initiation to provide low hysteresis, which elastomers do not suffer significant loss of other physical properties such as tear strength as generally occurs when elastomers are chemically modified to reduce hysteresis.

It is still another object of the present invention to provide tire components prepared from elastomers having a plurality of polymer molecules wherein substantially each molecule has a functional group on the initiating end, and the molecules may be terminated with a tin-containing group or other functional group known to provide similar hysteresis reducing properties.

At least one or more of the foregoing objects together with the advantages thereof over the existing art, which shall become apparent from the specification which follows, are accomplished by the invention as hereinafter described and claimed.

In general, an improved pneumatic tire having decreased rolling resistance comprising at least one tire component selected from the group consisting of subtreads, black sidewalls, body ply skims and bead fillers, prepared from a vulcanizable elastomeric composition having reduced hysteresis comprising from about 10 to 100 parts by weight of an elastomer comprising a plurality of polymer molecules, wherein substantially each polymer molecule contains at least one functional group at the site of initiation, and having a hysteresis reduction of at least about 10 percent compared to the same elastomer without a functional group on substantially each polymer molecule; from about 0 to 90 parts by weight of an elastomer having greater hysteresis than the elastomer having reduced hysteresis and selected from the group consisting of natural rubber, synthetic rubber and blends thereof, and, from about 20 to about 100 parts by weight of carbon black, per 100 parts of the elastomer.

A method of improving the rolling resistance of pneumatic tires comprises incorporating into the tire during manufacture at least one component selected from the group consisting of subtreads, black sidewalls, body ply skims and bead fillers, prepared from a vulcanizable elastomeric composition having reduced hysteresis comprising from about 10 to 100 parts by weight of a plurality of polymer molecules, wherein substantially each polymer molecule contains at least one functional group at the site of initiation, and having a hysteresis reduction of at least about 10 percent compared to the same elastomer without a functional group on substantially each polymer molecule; from about 0 to 90 parts by weight of an elastomer having greater hysteresis than the elastomer having reduced hysteresis and selected from the group consisting of natural rubber, synthetic rubber and blends thereof; and, from about 20 to about 100 parts by weight of carbon black, per 100 parts of the elastomer.

PREFERRED EMBODIMENT FOR CARRYING OUT THE INVENTION

As will become apparent from the description which follows, the present invention provides elastomeric compounds having a plurality of polymer chains wherein substantially all of the chains are provided with a functional end group. These elastomers have reduced hysteresis and can be blended with conventional elastomers having greater hysteresis. It has been found that vulcanizable elastomeric compounds and articles thereof based upon such functionally terminated polymers exhibit useful properties, particularly the property of reduced hysteresis. It has been discovered herein that when these functionalized elastomers are employed in tire components such as subtreads, black sidewalls, body ply skims and bead fillers, the tires containing at least one of these components exhibit decreased rolling resistance.

One functional group of interest that will impart reduced hysteresis to an elastomer when incorporated on substantially every polymer chain, is a tin containing group derived from a tin containing initiator. Such an initiator is the reaction product of a triorgano substituted-tin halide or a hexaorgano substituted di-tin compound with lithium metal in the presence of a suitable solvent. Preferred is a triorgano substituted-tin halide having the general formula $R_3SnX$. The organic moiety R is selected from the group consisting of alkyls having from about 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, menthyl and the like. The aryl and aralkyl groups include phenyl, benzyl and the like.

Such initiators may also be produced by other means. For example, the initiator may be formed as the reaction product of a hexaorgano-substituted di-tin compound $R_3SnSnR_3$ containing a tin-tin bond, with lithium metal (where R is as described hereinabove). Preferred di-tin compounds have between 6 and 12 carbon atoms, such as hexabutyldi-tin.

It is preferred that the initiators are the reaction product of from about 93 to about 99 percent by weight of an organotin compound and from about 1 to about 7 percent by weight of lithium.

The halide constituent X of the triorgano substituted-tin halide includes chlorides and bromides. Lithium is preferably present as a reactant in the form of lithium metal, and may also be present as a dispersion in mineral oil.

Preferably, the solvent employed is tetrahydrofuran, tetramethylethylenediamine, or diethylene methyl ether (diglyme). Some other solvents such as polar organic ethers, tertiary amines, dimethyl ether, diethyl ether and tributylamine, have been employed with unsatisfactory results, in that either the reaction does not go to completion or the trialkyl tin initiator reacts with the solvent. Not going to completion means that the reaction of the tin chloride compound with lithium metal gave less than appreciable amounts of the desired tin lithium compound with the predominant product being the intermediate hexaorgano substituted di-tin stage or no reaction at all.

The desired reaction product of the triorgano substituted-tin halide and the lithium is a triorgano substituted-tin lithium compound. The preferred initiator has the general formula $R_3SnLi$, where R is as defined hereinabove. One preferable catalyst is the reaction product of tributyl tin chloride and lithium metal in tetrahydrofuran, forming tributyl tin lithium.

As stated above, the initiator thus formed may be employed as an initiator to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Suitable monomers include conjugated dienes having from about 4 to about 12 carbon atoms and monovinyl aromatic monomers having 8 to 18 carbon atoms and trienes. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, a-methylstyrene, p-methylstyrene, vinyltoluene and vinylnaphthalene. The conjugated diene monomer and aromatic vinyl monomer are normally used at the weight ratios of 95–50:5–50, preferably 95–65:5–35.

Polymerization is usually conducted in a conventional solvent for anionic polymerizations such as hexane, cyclohexane, benzene and the like. Other techniques for polymerization, such as semi-batch and continuous polymerization may be employed. In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed.

Compounds useful as polar coordinators are organic and include tetrahydrofuran, linear and cyclic oligomeric oxolanyl alkanes such as 2–2'-di(tetrahydrofuryl) propane, di-piperidyl ethane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, owned by the Assignee of record, the subject matter of which is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); tetrahydrofuran (THF), THF oligomers linear and the like.

A batch polymerization is begun by charging a blend of monomer(s) and solvent to a suitable reaction vessel, followed by the addition of the polar coordinator (if employed) and the initiator compound previously described. The reactants are heated to a temperature of from about 20 to about 200° C., and the polymerization is allowed to proceed for from about 0.1 to about 24 hours. A tin atom is derived from the initiator compound and attaches at the initiation site. Thus, substantially every resulting polymer chain has the following general formula

$R_3SnYLi$ where R is as described above, the tin atom is derived from the polymerization initiator, and Y is a divalent polymer radical which is derived from any of the foregoing diene homopolymers, monovinyl aromatic polymers, diene/monovinyl aromatic random copolymers and block copolymers. The monomer addition at the lithium end causes the molecular weight of the polymer to increase as the polymerization continues.

To terminate the polymerization, and thus control polymer molecular weight, a terminating agent may be employed. Active hydrogen compounds such as water or alcohol can be used, or compounds providing terminal functionality (i.e., "endcapping") can be used such as tin tetrachloride, $R_3SnCl$, $R_2SnCl_2$, $RSnCl_3$, carbodiimides, N-methylpyrrolidine, cyclic amides, cyclic ureas, isocyanates, Schiff bases, 4,4'-bis(diethylamino) benzophenone, N,N'-dimethylethyleneurea and the like, where R is as described hereinabove. The terminating agent is added to the reaction vessel, and the vessel is agitated for about 1 to about 1000 minutes. Preferably, the terminating agent is a tin containing compound suitable for use as a terminator, such as tin tetrachloride or tributyl tin chloride. The chlorine on the tin reacts with the lithium end group of the resulting polymer chain, forming a polymer having the following general formula where R and Y are as previously described:

R3SnYSn where the second, terminal tin atom is appropriately bonded to other groups, polymer chains and the like to satisfy its valence. While tin containing compounds are preferred, if another terminating agent is selected, for instance, a carbodiimide, a N-methylpyrrolidinone, a cyclic amide, a cyclic urea, an isocyanate, a Schiff base, 4,4'-bis (diethylamino) benzophenone, N,N'-dimethylethyleneurea or the like, it will be understood that a different terminal functional group will be joined to the tin initiated polymer Y. Examples of useful endcapping agents which do not contain tin, as well as further examples of tin-containing endcapping agents are found in U.S. Pat. No. 4,616,069 which is herein incorporated by reference. Thus, it is to be appreciated that other terminating agents and/or procedures may be followed, and still fall within the scope of the present invention.

It is also to be understood that while the present invention employs polymers having functional end groups at the site of initiation or, at the site of initiation and the site of termination, where a coupling agent such as tin tetrachloride is selected, the second, terminal tin atom will appear at the middle of four polymer chains, although in reality, it is still joined to the terminal end of the various polymer chains.

As a result of terminal endcapping, an elastomer is produced having an even greater affinity for compounding materials such as carbon black, and hence, even further reduced hysteresis. With the tin group at both ends of the polymer chain, the loss of some of the living end of the polymer due to inefficient endcapping (i.e., the side reactions of the lithium) is not a drawback in that the presence of the tin end group from the initiator produces much of the desired reduction in hysteresis regardless of the inefficiency of the endcapping at the living end.

The polymer may be separated from the solvent by conventional techniques. These include steam or alcohol coagulation, thermal desolventization, or any other suitable method. Additionally, solvent may be removed from the resulting polymer by drum drying, extruder drying, vacuum drying or the like.

The elastomers employed to form the tire components of the present invention comprise a plurality of polymers, having at least one tin containing end group on substantially each polymer molecule or "chain", and if terminated with a suitable tin containing terminating agent, a tin group on both ends of the chain. Furthermore, as will be appreciated by one skilled in the art, a tetra functional tin molecule may also be used to produce a tin coupled product. As noted hereinabove, the tin containing end groups have an affinity for compounding materials such as carbon black. Such compounding results in products exhibiting reduced hysteresis, and when at least one of these components is incorporated into a pneumatic tire, decreased rolling resistance is obtained.

The reduced hysteresis polymers can be used alone or in combination with other elastomers to prepare the tire components. For example, they can be blended with any conventionally employed rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers having reduced hysteresis are blended with conventional rubbers, the amounts can vary widely such as between 10 and 100 percent by weight of the former with 0 to 90 parts by weight of the latter to total 100 parts, depending upon the amount of hysteresis reduction desired. Generally, the blend will result in a reduction in hysteresis of at least 10 percent and preferably, between about 15 and 35 percent.

The polymers can be compounded with carbon black in amounts ranging from about 20 to about 100 parts by weight, per 100 parts of rubber (phr), with about 30 to about 70 phr being preferred. The carbon blacks may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks.

Other carbon blacks which may be utilized include acetylene blacks. Mixtures of two or more of the above blacks can be used in preparing the carbon black products of the invention. Typical values for surface areas of sable carbon blacks are summarized in the following Table 1.

TABLE I

CARBON BLACKS

| ASTM Designation (D-1765-82a) | Surface Area (m²/g) (D-3765) |
|---|---|
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds may be in pelletized form or an unpelletized flocculant mass. Preferably, for more uniform mixing, unpelletized carbon black is preferred. The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination.

Vulcanizable elastomeric compositions employed to formulate the tire components according to the invention can be prepared by compounding or mixing the polymers thereof with carbon black and other conventional rubber additives such as fillers, plasticizers, antioxidants, curing agents and the like, using standard rubber mixing equipment and procedures and conventional amounts of such additives. Such elastomeric compounds when vulcanized using conventional rubber vulcanization conditions have reduced hysteresis properties.

A more complete disclosure pertaining to the use of tin containing initiators to provide a functional end group on substantially every polymer chain of an elastomer is provided in co-pending application U.S. Ser. No. 07/636,931, the subject matter of which is incorporated herein by reference. While the disclosure thus far has taught the use of tin containing initiators to provide elastomers having reduced hysteresis, the present invention is not limited thereto. More generally, any initiator that will provide a functional group on each polymer chain and, in turn, produce a reduction in hysteresis for the elastomer is within the scope of the present invention, when such elastomer is employed to manufacture a tire component such as a subtread, black sidewall, body ply skim or bead filler.

Exemplary of such initiators which will provide a reduction in hysteresis are the initiators derived from substituted ketimines, aldimines and secondary amines which are described in co-pending application U.S. Ser. No. 07/506, 305, U.S. Pat. No. 5,153,159 the subject matter of which is incorporated herein by reference.

Another initiator which will provide a reduction in hysteresis are the initiators derived from compounds having the general formula

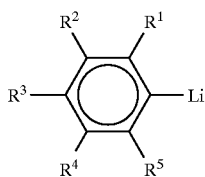

where $R^1$–$R^5$ of this formula are the same or different and are selected from the group consisting of hydrogen; alkyls having from 1 to about 12 carbon atoms; aralkyls having from 7 to about 20 carbon atoms; dialkylaminos having from 2 to about 20 carbon atoms; and, dialkylaminoalkyls having from 3 to about 20 carbon atoms. At least one of $R^1$–$R_5$ is selected from the group consisting of the dialkylaminos and the dialkylaminoalkyls. These initiators are described in co-pending application U.S. Ser. No. 07/814,935, U.S. Pat. No. 5,274,106 the subject matter of which is incorporated herein by reference.

Another initiator which will provide a reduction in hysteresis are the initiators derived from compounds selected from the group consisting of

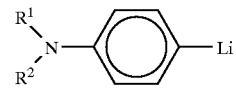

and,

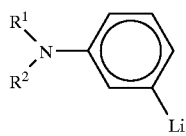

where $R^1$ and $R_2$ of these formulae are the same or different and are selected from the group consisting of alkyls having from 1 to about 12 carbon atoms, cycloalkyls having from 3 to about 14 carbon atoms, and aryls having from 6 to about 20 carbon atoms and which are described in co-pending application U.S. Ser. No. 07/814,550, U.S. Pat. No. 5,244, 966 the subject matter of which is incorporated herein by reference.

Another initiator which will provide some reduction in hysteresis is a lithium pyrrolidide as described in U.S. Pat. No. 4,935,471, the subject matter of which is incorporated herein by reference. It is also possible to employ a terminator that is reactive with the lithium end of an anionic polymer and will provide a reduction in hysteresis. Such a terminator includes the sulfoxide compounds having the formula

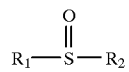

where the organic moiety $R_1$ and $R_2$ of this formula are selected from the group consisting of alkyls and sulfur substituted alkyls having from about 1 to about 20 carbon atoms, cycloalkyls having from about 3 to about 20 carbon atoms, aryls and halogen substituted aryls having from about 6 to about 20 carbon atoms and aralkyls having from about 7 to about 20 carbon atoms. These terminators are described in co-pending application U.S. Ser. No. 07/703,533, U.S. Pat. No. 5,151,469 the subject matter of which is incorporated herein by reference.

Another terminator which will provide a reduction in hysteresis are the lead compounds having the formula $R_3PbX$ wherein R of this formula is an organo group selected from the group consisting of alkyls having from about 1 to about 20 carbon atoms, cycloalkyls having from about 3 to about 20 carbon atoms, aryls having from about 6 to about 20 carbon atoms and aralkyls having from about 7 to about 20 carbon atoms, and X is a halogen selected from the group consisting of bromine, chlorine and iodine. These terminators are described in co-pending application U.S. Ser. No. 07/703,534, now ABN the subject matter of which is incorporated herein by reference.

It is to be understood that the tire components of the present invention can be prepared from elastomers that have been initiated with one of the foregoing initiators, or terminated with one of the foregoing terminators, or both. Moreover, the foregoing disclosure is not intended to be limiting inasmuch as those skilled in the art can select other compounds to impart terminal functionality to polymer chains the presence of which will reduce hysteresis. It is generally preferable to initiate the polymer chain with a compound that will impart functionality to ensure that every chain contains such a group. Although it is possible in some circumstances to add the same functional group to the terminal end e.g., tin, greater care must be exercised when terminating to incorporate the group on every chain. When tin or other functional group is incorporated at the time of initiation, every chain must contain such a group, thereby ensuring the desired reduction in hysteresis.

GENERAL EXPERIMENTAL

In order to demonstrate the preparation and properties of various tire components according to the present invention, a tin containing initiator was first prepared by reacting tributyl tin chloride with lithium metal in tetrahydrofuran. Solutions of styrene and butadiene monomers in hexane were prepared and polymerized with the above described initiator. Similar monomer solutions were polymerized with n-butyl lithium as an initiator. Termination of all polymerizations was carried out by reaction with isopropyl alcohol or, with a tin containing terminating (endcapping) agent, namely, tributyl tin chloride, dibutyl tin dichloride or tin tetrachloride. As noted above, various techniques known in the art for carrying out polymerizations may be employed without departing from the scope of the present invention. Polymerizations were controlled to provide a number average molecular weight of about 125,000. Preparation of the tin initiators and the copolymers is set forth hereinbelow.

Initiator Preparation—Tributyl tin lithium

A solution was prepared comprising 68 cc of dry, peroxide free tetrahydrofuran and 27.1 cc of neat (undiluted) tributyl tin chloride having a concentration of 3.69 moles/liter. To this was added 9.2 cc of a 20–30 percent mineral oil dispersion of lithium metal (0.2–0.3 moles of lithium), and the mixture was mixed gently for 20 hours. A temperature rise of over 50° C. was noted. A powder-like precipitate of lithium chloride was noted, plus a clear middle layer, and a top layer of unreacted lithium dispersion. The clear, yellow to dark green center layer, containing of tributyl tin lithium in tetrahydrofuran, was isolated and used in the polymerizations reported hereinbelow.

Polymerization

Polymer Example Nos. 1–8

To a 5 gal. reactor vessel was added 2361 grams of hexane and 9398 grams of a 24.9% butadiene in hexane blend (2340 grams of butadiene). To the monomer blend was then added 19.7 millimoles (mM) tributyl tin lithium catalyst. The catalyst was charged to the reactor vessel at about 20° C. Prior to the catalyst addition, the monomer blend was found to contain an impurity level that would consume 1–2 mM of lithium catalyst. As a result, the charge of catalyst included an excess thereof needed to react with the impurities measured.

After about 1 hour the temperature was raised to about 45° C. After 3 hours at 45° C., 28 bottles (840 cc) of live cement containing about 420 grams of solution was removed and terminated with various agents. Seven bottles of live cement were terminated with 0.7 milliequivalents (mE) of dibutyl tin dichloride ($Bu_2SnCl_2$); seven bottles of live cement were terminated with 0.7 (mE) of tin tetrachloride ($SnCl_4$); seven bottles of live cement were terminated with 0.7 (mE) of tributyl tin chloride ($Bu_3SnCl$); and, seven bottles of live cement were terminated with 0.7 (mE) of isopropanol. These polymers were used for Polymer Example Nos. 1–4.

Similar polymerizations were carried out with butyl lithium and terminated in the same manner to provide Polymer Example Nos. 5–8. The eight PBd homopolymers thus prepared are summarized in Table II. Each polymer was coupled or terminated as set forth in Table II, as is a schematic depiction of the polymer structure. Polymer Example No. 8 served as a control, being initiated with n-butyl lithium and terminated with isopropyl alcohol. Hence, it does not have terminal functionality and possessed the highest hysteresis.

TABLE II

INITIATION/TERMINATING-COUPLING OF PBD COPOLYMERS

| Polymer Example No. | Initiator | Terminating-Coupling Agent | Polymer structure |
|---|---|---|---|
| 1 | $R_3SnLi$ | $R_3SnCl$ | Sn~PBd~Sn |
| 2 | $R_3SnLi$ | ROH[a] | Sn~PBd~ |
| 3 | $R_3SnLi$ | $R_2SnCl_2$ | Sn~PBd~Sn~PBd~Sn |
| 4 | $R_3SnLi$ | $SnCl_4$ | (Sn~PBd~)$_4$Sn |
| 5 | RLi | $SnCl_4$ | (~PBd~)$_4$Sn |
| 6 | RLi | $R_2SnCl_2$ | ~PBd~Sn~PBd~ |
| 7 | RLi | $R_3SnCl$ | ~PBd~Sn |
| 8 | RLi | ROH[a] | ~PBd~ |

[a]Isopropyl alcohol

The eight PBd copolymers of Table II were then blended with natural rubber and other components as set forth in Table III which follows.

TABLE III

BLACK TIRE COMPONENT COMPOUNDS

| Polybutadiene | 82.5 |
|---|---|
| Natural rubber | 82.5 |
| Carbon black N343 | 80.0 |
| Zinc oxide | 4.95 |
| Santoflex 13[a] | 1.57 |
| Wax | 1.65 |
| Naphthenic process oil | 17.33 |
| Piccopale 100 resin | 3.30 |
| Rubber Masterbatch | 270.0 |
| Sulfur | 2.47 |
| Altax[b] | 0.41 |

TABLE III-continued

BLACK TIRE COMPONENT COMPOUNDS

| | |
|---|---|
| Sulfasan R[c] | 1.23 |
| Stearic acid | 3.30 |
| TOTAL | 277.41 |

[a]N-(1,3-dimethylbutyl)-N'-phenyl-paraphenylenediamine
[b]Registered trademark of R. T. Vanderbilt Company, Inc. for 2,2'dithiobisbenzothiazole
[c]Morpholine disulfide The masterbatch was prepared on a Banbury mixer employing a jacket temperature of 80° C. and rpm=60. The order of addition of components began with both of the polymers first, followed by one-half of the carbon black and all other pigment, followed by all of the process oil and then the remaining one-half of carbon black. The polybutadienes employed were those recited in Table II and provided eight compounds (Nos. 9–16). Polymer Example No. 1 was utilized to prepare Compound No. 9 and so forth.

The resulting eight compounds (Nos. 9–16) were then subjected to physical testing as set forth in Table IV hereinbelow.

TABLE IV

REBOUND AND TANδ OF SBR COPOLYMERS

| Compound No. | Polymer Example No. | Rebound 60° C. | Tanδ 50° C. |
|---|---|---|---|
| 9 | 1 | 70.0 | 0.092 |
| 10 | 2 | 65.4 | 0.121 |
| 11 | 3 | 69.8 | 0.092 |
| 12 | 4 | 69.8 | 0.093 |
| 13 | 5 | 65.8 | 0.117 |
| 14 | 6 | 67.8 | 0.099 |
| 15 | 7 | 67.0 | 0.113 |
| 16 | 8 | 60.0 | 0.159 |

In order to demonstrate the efficacy of low hysteresis compounds in tire components, separate compounds were prepared to form a subtread, black sidewall, body ply skim and bead filler components and subsequently tested for tan delta (at 50° C.), and the change in tan delta as compared to a control polymer. The rubber component of the compounds comprised blends of natural rubber (NR) with a low hysteresis polymer comprising polybutadiene (PBd), prepared as discussed hereinabove. The formulations are presented in Table V, hereinbelow. Parts are expressed as parts per hundred of rubber (phr). As controls for the black sidewall and subtread, the same formulations of natural rubber and polybutadiene were employed except the polybutadiene was a conventional rubber having a greater hysteresis. As a control for the body ply skim, the formulation comprised natural rubber and a conventional SBR, having greater hysteresis than the low hysteresis polybutadiene employed for the body ply of the present invention. Finally, the control formulation for the bead filler comprised 100 parts by weight of natural rubber as the elastomeric component.

TABLE V

LOW HYSTERESIS TIRE COMPONENTS

| | Black Sidewall | Subtread | Body Ply Skim | Bead Filler | Control |
|---|---|---|---|---|---|
| NR | 40 | 60 | 65 | 75 | 100 |
| (Sn~PBd~)$_4$ Sn | 60 | 40 | — | 25 | — |
| Carbon Black | | | | | |
| N550 | 55 | 35 | | | |
| N330 | | | 42 | 80 | 80 |
| Oil | 13 | 5.5 | 7.0 | 0 | 0 |
| Sulfur | 2.6 | 1.3 | 2.5 | 12.5 | 12.5 |
| accelerator | 0.8 | 1.8 | 1.2 | 1.0 | 1.0 |

Two tread compounds were also prepared, one as a control which was merely coupled with tin tetrachloride and the other as an experimental tread initiated and terminated with tin compounds so as to be difunctional. The formulations are presented in Table VI, hereinbelow. Parts are expressed as parts per hundred of rubber (phr).

TABLE VI

TREAD COMPOUNDS

| | Control | Experimental |
|---|---|---|
| NR | — | 15 |
| (SBR)$_4$Sn | 75 | — |
| Sn~SBR~Sn | — | 85 |
| SBR[a] | 25 | — |
| Carbon black N343 | 48 | 45 |
| oil | 11 | 15 |
| sulfur | 1.5 | 1.8 |
| accelerator | 1.0 | 0.85 |

[a]n-butyl lithium initiated, alcohol terminated

Next, hysteresis measurements were made of each component and the two tire treads stocks. The results appear in Table VII, compared against the control of Table VI, and the percent reduction over the control is also reported.

TABLE VII

HYSTERESIS OF EXPERIMENTAL TIRE COMPONENTS
TANδ at 50° C.

| | Control (C) | Experimental (E) |
|---|---|---|
| Black Sidewall | 0.142 | 0.105 (−26%) |
| Subtread | 0.066 | 0.045 (−32%) |
| Body Ply | 0.151 | 0.113 (−25%) |
| Bead Filler | 0.215 | 0.160 (−25%) |
| Tread | Ca .12 | 0.083 (−30%) |

Finally, the effect of reduced hysteresis on rolling loss for the tire components of the present invention were evaluated by building a series of P205/70R14 tires, each group of tires having a different component than the tires of the other groups. The components of each series of tires are presented in Table VIII. In the table, a conventional component is designated by the letter C, indicating that the particular compound did not possess low hysteresis. The component, according to the present invention is designated by the letter E, followed by the percent of Tan δ reduction at 50° C. within parentheses. The number of tires (n) for each group is also reported. Mean drum rolling loss (DRL) was determined according to SAE J1269 and has been reported in pounds in Table VIII. The percent reduction in mean DRL has also been provided.

TABLE VIII

EFFECT OF REDUCED HYSTERESIS TIRE COMPONENTS ON ROLLING LOSS

| | | | | | | |
|---|---|---|---|---|---|---|
| Tread | C | C | C | C | C | E (−30%) |
| Subtread | C | E (−32%) | E | E | E | E |
| Black Sidewall | C | C | E (−26%) | E | E | E |
| Body Ply Skim | C | C | C | E (−25%) | E | E |
| Bead Filler | C | C | C | C | E (−25%) | C |
| | | | | | | |
| n | 20 | 5 | 9 | 5 | 18 | 8 |
| Mean Drum Rolling Loss (lbs) | 7.98 | 7.96 | 7.72 | 7.50 | 7.46 | 6.59 |
| Percent Reduction | PAR | <1 | 3.25 | 6.0 | 6.5 | 17.4 |

From the values reported in Table VIII, it can be seen that the rolling resistance was least affected by use of a low hysteresis subtread, while the greatest effect was provided by the known use of a low hysteresis tread. In conclusion, the contribution to rolling resistance by the various tire components, for this particular tire construction, having a low hysteresis was as follows: tread, 11 percent reduction; black sidewall and body ply skim, 3 percent reduction; bead filler, less than 1 percent reduction; and, subtread, less than 1 percent reduction. However, rolling resistance should be different dependent upon the type of tire construction and thus, the use of low hysteresis non-tread components can contribute more of less to different degrees than in the case illustrated hereinabove.

It should now be clear from the foregoing examples and specification disclosure, that the use of various tire components such as subtreads, black sidewalls, body ply skims and bead fillers having reduced hysteresis, according to the present invention, will provide tires having decreased rolling resistance. The elastomeric polymers employed for the manufacture of the tire components can carry a functional group at the cite of initiation and they may also be end-capped with another functionality, thus providing a difunctional polymer with still greater reduction of hysteresis.

It is to be understood that the invention is not limited to the specific initiator reactants, organotin lithium initiators, other initiators, monomers, terminators, polar coordinators or solvents disclosed herein, except as otherwise stated in the specification. Similarly, the examples have been provided merely to demonstrate practice of the subject invention and do not constitute limitations of the invention. Those skilled in the art may readily select other initiators and/or terminators, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

I claim:

1. An improved pneumatic tire having decreased rolling resistance employing at least one tire component selected from the group consisting of subtreads, black sidewall, body ply skims and bead fillers, prepared from a vulcanizable elastomeric composition having reduced hysteresis comprising:

from about 10 to 100 parts by weight of an elastomer comprising a plurality of polymer molecules, wherein substantially each said polymer molecule contains at least one functional group at the site of initiation, wherein said functional group has a component selected from the group consisting of tin, lead, pyrrolidide, aryl, substituted ketimines, substituted aldimines and substituted secondary amines, and having a hysteresis reduction of at least about 10 percent compared to the same elastomer without a functional group on substantially each polymer molecule; and, from about 0 to 90 parts by weight of an elastomer having greater hysteresis than said elastomer having reduced hysteresis and selected from the group consisting of natural rubber, synthetic rubber and blends thereof;

from about 20 to about 100 parts by weight of carbon black, per 100 parts of said elastomer.

2. An improved pneumatic tire, as set forth in claim 1, wherein said elastomer is formed from at least one monomer selected from the group consisting of conjugated diene monomers having from about 4 to 12 carbon atoms, alone or mixed with vinyl aromatic monomers having from about 8 to 18 carbon atoms and trienes.

3. An improved pneumatic tire, as set forth in claim 1, wherein substantially each of said polymer molecules before termination has the general formula $R_3SnYLi$ where R is an organo group and Y is a polymer selected from the group consisting of diene homopolymers, diene/monovinyl aromatic random copolymers and block copolymers.

4. An improved pneumatic tire, as set forth in claim 3, wherein said organo group R is selected from the group consisting of alkyls having from about 1 to about 20 carbon atoms, cycloalkyls having from about 3 to about 20 carbon atoms, aryls having from about 6 to about 20 carbon atoms and aralkyl having from about 7 to about 20 carbon atoms.

5. An improved pneumatic tire, as set forth in claim 4, wherein said tire component having reduced hysteresis is a subtread.

6. An improved pneumatic tire, as set forth in claim 5, wherein said tire further comprises a tread component formed from an elastomeric composition having reduced hysteresis.

7. An improved pneumatic tire, as set forth in claim 4, wherein said tire component having reduced hysteresis is a black sidewall.

8. An improved pneumatic tire, as set forth in claim 7, wherein said tire further comprises a tread component formed from an elastomeric composition having reduced hysteresis.

9. An improved pneumatic tire, as set forth in claim 4, wherein said tire component having reduced hysteresis is a body ply skim.

10. An improved pneumatic tire, as set forth in claim 9, wherein said tire further comprises a tread component formed from an elastomeric composition having reduced hysteresis.

11. An improved pneumatic tire, as set forth in claim 4, wherein said tire component having reduced hysteresis is a bead filler.

12. An improved pneumatic tire, as set forth in claim 11, wherein said tire further comprises a tread component formed from an elastomeric composition having reduced hysteresis.

13. An improved pneumatic tire, as set forth in claim 1, wherein a plurality of said polymer molecules are endcapped with an endcapping agent.

14. An improved pneumatic tire, as set forth in claim 13, wherein said endcapping agent is selected from the group consisting of tin tetrachloride, tributyl tin chloride and dibutyl tin dichloride.

15. An improved pneumatic tire, as set forth in claim 4, wherein a plurality of said polymer molecules are endcapped with an endcapping agent.

16. An improved pneumatic tire, as set forth in claim 15, wherein said endcapping agent is selected from the group consisting of tin tetrachloride, tributyl tin chloride and dibutyl tin dichloride.

17. An improved pneumatic tire, as set forth in claim 16, wherein said tire component having reduced hysteresis is a subtread.

18. An improved pneumatic tire, as set forth in claim 17, wherein said tire further comprises a tread component formed from an elastomeric composition having reduced hysteresis.

19. An improved pneumatic tire, as set forth in claim 16, wherein said tire component having reduced hysteresis is a black sidewall.

20. An improved pneumatic tire, as set forth in claim 19, wherein said tire further comprises a tread component formed from an elastomeric composition having reduced hysteresis.

21. An improved pneumatic tire, as set forth in claim 16, wherein said tire component having reduced hysteresis is a body ply skim.

22. An improved pneumatic tire, as set forth in claim 21, wherein said tire further comprises a tread component formed from an elastomeric composition having reduced hysteresis.

23. An improved pneumatic tire, as set forth in claim 16, wherein said tire component having reduced hysteresis is a bead filler.

24. An improved pneumatic tire, as set forth in claim 23, wherein said tire further comprises a tread component formed from an elastomeric composition having reduced hysteresis.

25. A method of improving the rolling resistance of pneumatic tires comprises:

incorporating into said tire during manufacture at least one component selected from the group consisting of subtreads, black sidewalls, body ply skims and bead fillers, prepared from a vulcanizable elastomeric composition comprising from about 10 to 100 parts by weight of an elastomer comprising a plurality of polymer molecules, wherein substantially each said polymer molecule contains at least one functional group at the site of initiation, wherein said functional group has a component selected from the group consisting of tin, lead pyrrolidide, aryl, substituted ketimines, substituted aldimines and substituted secondary amines, and having a hysteresis reduction of at least about 10 percent compared to the same elastomer without a functional group on substantially each said polymer molecule;

from about 0 to 90 parts by weight of an elastomer having greater hysteresis than said elastomer having reduced hysteresis and selected from the group consisting of natural rubber, synthetic rubber and blends thereof; and, from about 20 to about 100 parts by weight of carbon black, per 100 parts of said elastomer.

26. A method as set forth in claim 25, wherein said elastomeric composition is prepared from at least one monomer selected from the group consisting of conjugated dienes having from about 4 to about 12 carbon atoms, alone or mixed with monovinyl aromatic monomers having 8 to 18 carbon atoms and trienes.

27. A method as set forth in claim 25, wherein substantially each of said polymer molecules before termination has the general formula $R_3SnYLi$ where R is an organo group and Y is a polymer selected from the group consisting of diene homopolymers, diene/monovinyl aromatic random copolymers and block copolymers.

28. A method as set forth in claim 27, wherein said organo group R is selected from the group consisting of alkyls having from about 1 to about 20 carbon atoms, cycloalkyls having from about 3 to about 20 carbon atoms, aryls having from about 6 to about 20 carbon atoms and aralkyl having from about 7 to about 20 carbon atoms.

29. A method as set forth in claim 28, wherein said tire component having reduced hysteresis is a subtread.

30. A method as set forth in claim 29, comprising the further step of employing a tread component formed from an elastomeric composition having reduced hysteresis.

31. A method as set forth in claim 28, wherein said tire component having reduced hysteresis is a black sidewall.

32. A method as set forth in claim 31, comprising the further step of employing a tread component formed from an elastomeric composition having reduced hysteresis.

33. A method as set forth in claim 28, wherein said tire component having reduced hysteresis is a body ply skim.

34. A method as set forth in claim 33, comprising the further step of employing a tread component formed from an elastomeric composition having reduced hysteresis.

35. A method as set forth in claim 28, wherein said tire component having reduced hysteresis is a bead filler.

36. A method as set forth in claim 35, comprising the further step of employing a tread component formed from an elastomeric composition having reduced hysteresis.

37. An improved pneumatic tire, as set forth in claim 25, wherein a plurality of said polymer molecules are endcapped with an endcapping agent.

38. A method as set forth in claim 37, wherein said endcapping agent is selected from the group consisting of tin tetrachloride, tributyl tin chloride and dibutyl tin dichloride.

39. A method as set forth in claim 28, wherein a plurality of said polymer molecules are endcapped with an endcapping agent.

40. A method as set forth in claim 39, wherein said endcapping agent is selected from the group consisting of tin tetrachloride, tributyl tin chloride and dibutyl tin dichloride.

41. A method as set forth in claim 40, wherein said tire component having reduced hysteresis is a subtread.

42. A method as set forth in claim 41, comprising the further step of employing a tread component formed from an elastomeric composition having reduced hysteresis.

43. A method as set forth in claim 40, wherein said tire component having reduced hysteresis is a black sidewall.

44. A method as set forth in claim 43, comprising the further step of employing a tread component formed from an elastomeric composition having reduced hysteresis.

45. A method as set forth in claim 40, wherein said tire component having reduced hysteresis is a body ply skim.

46. A method as set forth in claim 45, comprising the further step of employing a tread component formed from an elastomeric composition having reduced hysteresis.

47. A method as set forth in claim 40, wherein said tire component having reduced hysteresis is a bead filler.

48. A method as set forth in claim 47, comprising the further step of employing a tread component formed from an elastomeric composition having reduced hysteresis.

* * * * *

UNITED STATES PATENT AND TRADEMARK OFFICE
CERTIFICATE OF CORRECTION

PATENT NO. : 5,955,531
DATED : September 21, 1999
INVENTOR(S) : Shingo Futamura

It is certified that error appears in the above-identified patent and that said Letters Patent are hereby corrected as shown below:

Claim 1; column 13, line 66, insert the word "sulfur," after --lead,--

Signed and Sealed this

Twenty-ninth Day of May, 2001

Attest:

NICHOLAS P. GODICI

Attesting Officer

Acting Director of the United States Patent and Trademark Office